United States Patent
Poole et al.

(10) Patent No.: US 8,804,751 B1
(45) Date of Patent: Aug. 12, 2014

(54) FIFO BUFFER WITH MULTIPLE STREAM PACKET SEGMENTATION

(75) Inventors: Glenn Poole, Fremont, CA (US); Brad Danofsky, Las Vegas, NV (US); David Haddad, San Jose, CA (US); Ann Gui, Cupertino, CA (US); Heeloo Chung, San Francisco, CA (US); Joanna Lin, San Jose, CA (US)

(73) Assignee: Force10 Networks, Inc., San Jose, CA (US)

(*) Notice: Subject to any disclaimer, the term of this patent is extended or adjusted under 35 U.S.C. 154(b) by 1417 days.

(21) Appl. No.: 11/537,958

(22) Filed: Oct. 2, 2006

Related U.S. Application Data

(60) Provisional application No. 60/723,471, filed on Oct. 4, 2005, provisional application No. 60/724,094, filed on Oct. 6, 2005.

(51) Int. Cl.
*H04L 12/28* (2006.01)
*H04L 12/56* (2006.01)

(52) U.S. Cl.
CPC ................................ *H04L 49/90* (2013.01)
USPC ........... 370/412; 370/229; 370/352; 370/369; 370/375; 370/413

(58) Field of Classification Search
None
See application file for complete search history.

(56) References Cited

U.S. PATENT DOCUMENTS

| | | | | |
|---|---|---|---|---|
| 5,796,776 | A * | 8/1998 | Lomp et al. | 375/222 |
| 6,014,385 | A * | 1/2000 | Ayanoglu et al. | 370/458 |
| 6,421,343 | B1 * | 7/2002 | Jun et al. | 370/395.72 |
| 6,876,629 | B2 * | 4/2005 | Beshai et al. | 370/232 |
| 6,888,824 | B1 * | 5/2005 | Fang et al. | 370/359 |
| 6,888,848 | B2 * | 5/2005 | Beshai et al. | 370/474 |
| 6,907,002 | B2 * | 6/2005 | Beshai et al. | 370/230 |
| 6,975,638 | B1 * | 12/2005 | Chen et al. | 370/412 |
| 7,042,883 | B2 * | 5/2006 | Fan et al. | 370/395.4 |
| 7,079,845 | B2 * | 7/2006 | Shively et al. | 455/452.1 |
| 7,082,127 | B1 * | 7/2006 | Hook | 370/366 |
| 7,154,902 | B1 * | 12/2006 | Sikdar | 370/412 |
| 7,155,532 | B2 * | 12/2006 | Schoenblum | 709/231 |
| 7,274,696 | B1 * | 9/2007 | Sikdar | 370/391 |
| 7,277,425 | B1 * | 10/2007 | Sikdar | 370/366 |
| 2003/0063562 | A1 * | 4/2003 | Sarkinen et al. | 370/230 |
| 2003/0179532 | A1 * | 9/2003 | Goergen | 361/118 |
| 2004/0059826 | A1 * | 3/2004 | Gould et al. | 709/231 |
| 2004/0141494 | A1 * | 7/2004 | Beshai et al. | 370/352 |
| 2004/0213291 | A1 * | 10/2004 | Beshai et al. | 370/473 |
| 2005/0089054 | A1 * | 4/2005 | Ciancaglini et al. | 370/412 |
| 2006/0146814 | A1 * | 7/2006 | Shah et al. | 370/389 |
| 2007/0140230 | A1 * | 6/2007 | Beshai | 370/360 |
| 2008/0069125 | A1 * | 3/2008 | Reed et al. | 370/410 |
| 2008/0165688 | A1 * | 7/2008 | Beshai et al. | 370/232 |

* cited by examiner

*Primary Examiner* — Faruk Hamza
*Assistant Examiner* — Aixa A Guadalupe-Cruz
(74) *Attorney, Agent, or Firm* — Haynes and Boone, LLP

(57) ABSTRACT

An epoch-based network processor internally segments packets for processing and aggregation in epoch payloads. FIFO buffers interact with a memory management unit to efficiently manage the segmentation and aggregation process.

51 Claims, 6 Drawing Sheets

| SEGMENT SIZE = 480 MAX SEGMENT SIZE = 528 | SEGMENT | LENGTH | FSF | LSF |
|---|---|---|---|---|
| SMALL PACKET, SIZE = 256 <br> P1 | P1.1 | 272 | 1 | 1 |
| MEDIUM PACKET, SIZE = 800 <br> P2 | P2.1 <br> P2.2 | 816 <br> 352 | 1 <br> 0 | 0 <br> 1 |
| MEDIUM PACKET, SIZE = 976 <br> P3 | P3.1 <br> P3.2 | 992 <br> 528 | 1 <br> 0 | 0 <br> 1 |
| LARGE PACKET, SIZE = 1200 <br> P4 | P4.1 <br> P4.2 <br> P4.3 | 1216 <br> 480 <br> 288 | 1 <br> 0 <br> 0 | 0 <br> 0 <br> 1 |

NO SEGMENTATION: 6 PACKETS IN 3 EPOCHS

WITH SEGMENTATION: 7.5 PACKETS IN 3 EPOCHS

FIFO BUFFER WITH MULTIPLE STREAM PACKET SEGMENTATION

CROSS REFERENCE TO RELATED APPLICATIONS

This application claims priority to U.S. Application Ser. No. 60/723,471 filed Oct. 4, 2005, and U.S. Application Ser. No. 60/724,094, filed Oct. 6, 2005, which are incorporated herein by reference in their entirety.

FIELD OF THE INVENTION

The present disclosure relates generally to network processing devices, and more particularly to internal packet handling in such devices.

BACKGROUND

Packet network processing devices, such as switches and routers, generally receive data packets on multiple ingress ports, perform some sort of processing, and resend the data packets on appropriate ones of multiple egress ports. Packets can be received with a variety of packet lengths, from less than 100 bytes including the packet headers, to common Maximum Transmission Unit (MTU) packet sizes of about 1500 bytes, and any size in between. Some networks also allow "Jumbo" packets, for instance packets up to almost 10,000 bytes in length. Traffic patterns at a given port will generally contain a mix of packet lengths. Regardless of the traffic mix, the network processing device is expected to successfully switch/route its rated bandwidth, in bytes/second, through each of its ports.

BRIEF DESCRIPTION OF THE DRAWINGS

Aspects of the present disclosure are best understood from the following detailed description when read with the accompanying figures.

DETAILED DESCRIPTION

The following embodiments describe a network processing device having an epoch-switched internal switch fabric. An epoch is a length of time during which the switch fabric maintains a given input port-to-output port configuration, allowing packets to pass from selected switch fabric ingress ports to selected switch fabric egress ports. The switch fabric is reconfigured from epoch to epoch by a scheduler that prioritizes the flow of traffic through the device.

As used herein, segmentation refers to the splitting of a packet into two or more shorter length packet segments prior to some internal operation of the network processing device. After one or more internal operations are performed separately on the segments, but prior to the packet exiting the device, the segments are recombined.

Figure 1A:
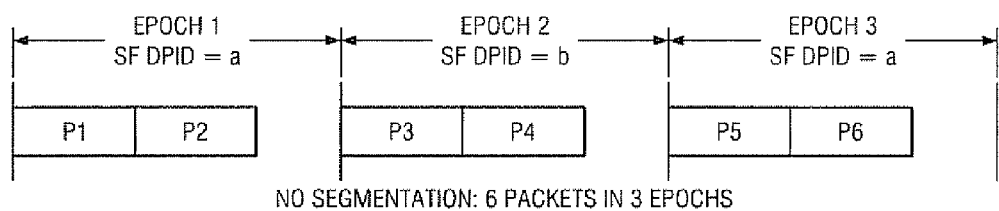
FIGS. 1A and 1B compares epoch-based packet transmission for non-segmented and internally segmented packets.
Figure 1B:
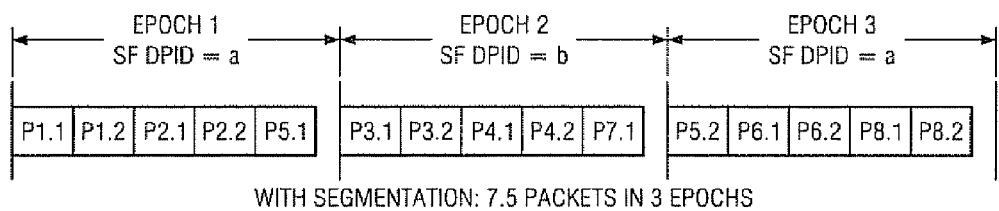

FIGS. 1A and 1B compare standard epoch behavior for an ingress unit over three consecutive epochs (FIG. 1A) with epoch behavior for the same unit operating according to a segmentation embodiment (FIG. 1B). During epochs 1 and 3, the ingress unit is passing packets through the switch fabric (SF) to an egress unit with a switch fabric destination port ID (DPID) a. In epoch 2, the ingress unit is passing packets through the switch fabric to an egress unit with an SF DPID b. In FIG. 1A, two packets (p1 and p2) are transmitted to DPID a during epoch 1, and the remainder of the epoch's bandwidth is wasted because another packet cannot fit in the remaining time. Two packets (p3 and p4) are transmitted to DPID b during epoch 2, with the same amount of wasted bandwidth. And two more packets (p5 and p6) are transmitted to DPID a again during epoch 3, with the same amount of wasted bandwidth.

In FIG. 1B, the packets are allowed to be segmented into segments that are one-half of the original packet length (for instance, segments p1.1 and p1.2 make up packet p1). The segments are independently transferable across the switch fabric. Accordingly, both segments of p1, both segments of p2, and one segment of p5 (segment p5.1) are transferred to DPID a during epoch a. The remainder of p5 (segment p5.2) is transferred to DPID a the next time that port is visited during epoch 3, along with both segments of p6 and two segments of another packet p8. In this example, 25% more switch fabric bandwidth is utilized due to the ability to transfer packet segments instead of requiring whole packets only within an epoch.

Figure 2:
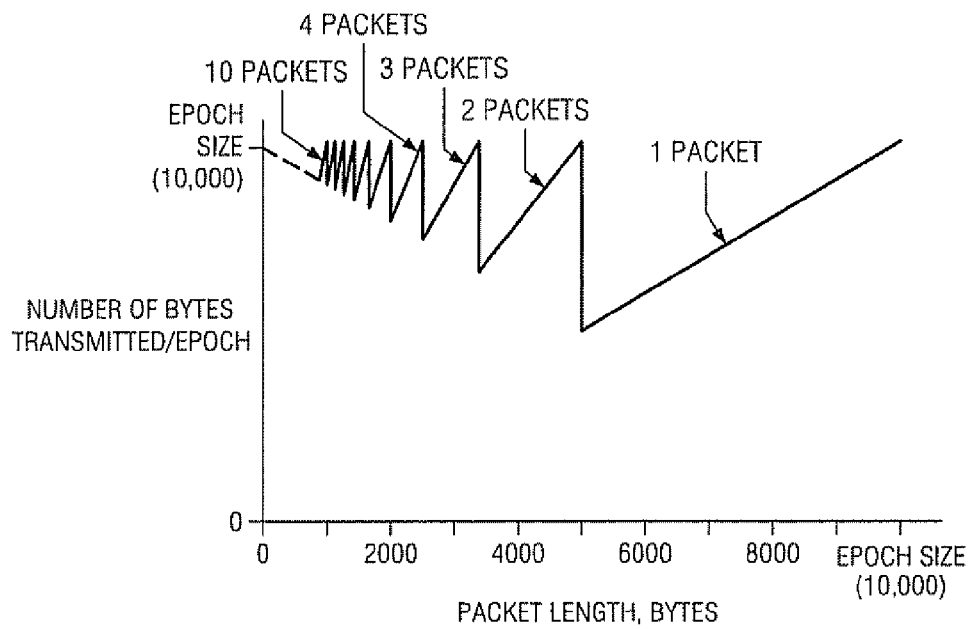
FIG. 2 contains a graph showing number of bytes transmitted per epoch as a function of packet length for non-segmented packets.
Figure 3:
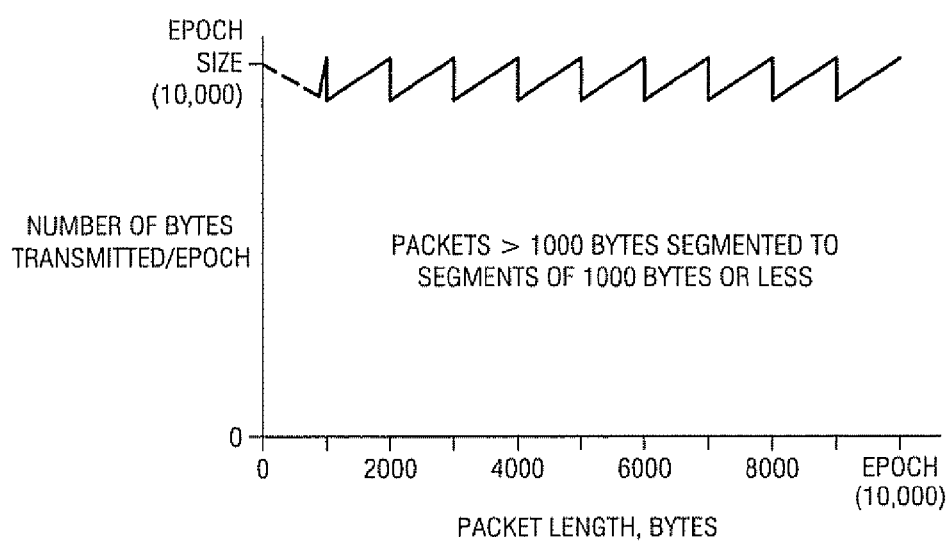
FIG. 3 contains a graph showing number of bytes transmitted per epoch as a function of packet length for packets segmented to 1000 bytes or less in size.

The comparative performance of these two systems is further illustrated in FIGS. 2 and 3, which plot bytes transmitted/epoch against packet length in bytes, assuming all packets have a fixed length and the epoch size is 10,000 bytes. FIG. 2 shows the performance for epochs that only contain whole packets. The performance follows a zigzag pattern, decreasing to a low that equates to 50% bandwidth efficiency for packets 5001 bytes in length.

By segmenting large packets into smaller segments, the efficiency is increased for larger packet sizes. And by choosing a segment size that is not too small, the efficiency for small packets is not significantly affected. The efficiency of a given packet/segment maximum size is approximately given by the formula:

$$\text{efficiency} = \text{packet\_bytes} * \text{floor}(\text{epoch\_bytes}/\text{packet\_bytes})/\text{epoch\_bytes}$$

This formula does not account for additional headers used for each segment.

In a world where the traffic length cannot be controlled, what matters is the length of the next packet that would be transmitted as compared to the length of time remaining in the epoch. FIG. 2 gives some expectation that lost bandwidth could be significant when large packets appear frequently in the traffic mix.

FIG. 3 shows a similar graph, but in a system where all packets larger than 1000 bytes are segmented into multiple segments, each no larger than 1000 bytes. On the average, even when the last packet added to an epoch is always larger than 1000 bytes, 95% bandwidth utilization is achieved, and worst case bandwidth utilization is 90%.

In addition to increasing average switch fabric throughput, segmentation as described below can decrease latency at several points in the device, and significantly reduce buffer size. These potential advantages will become apparent as the following device components are described.

Figure 4:
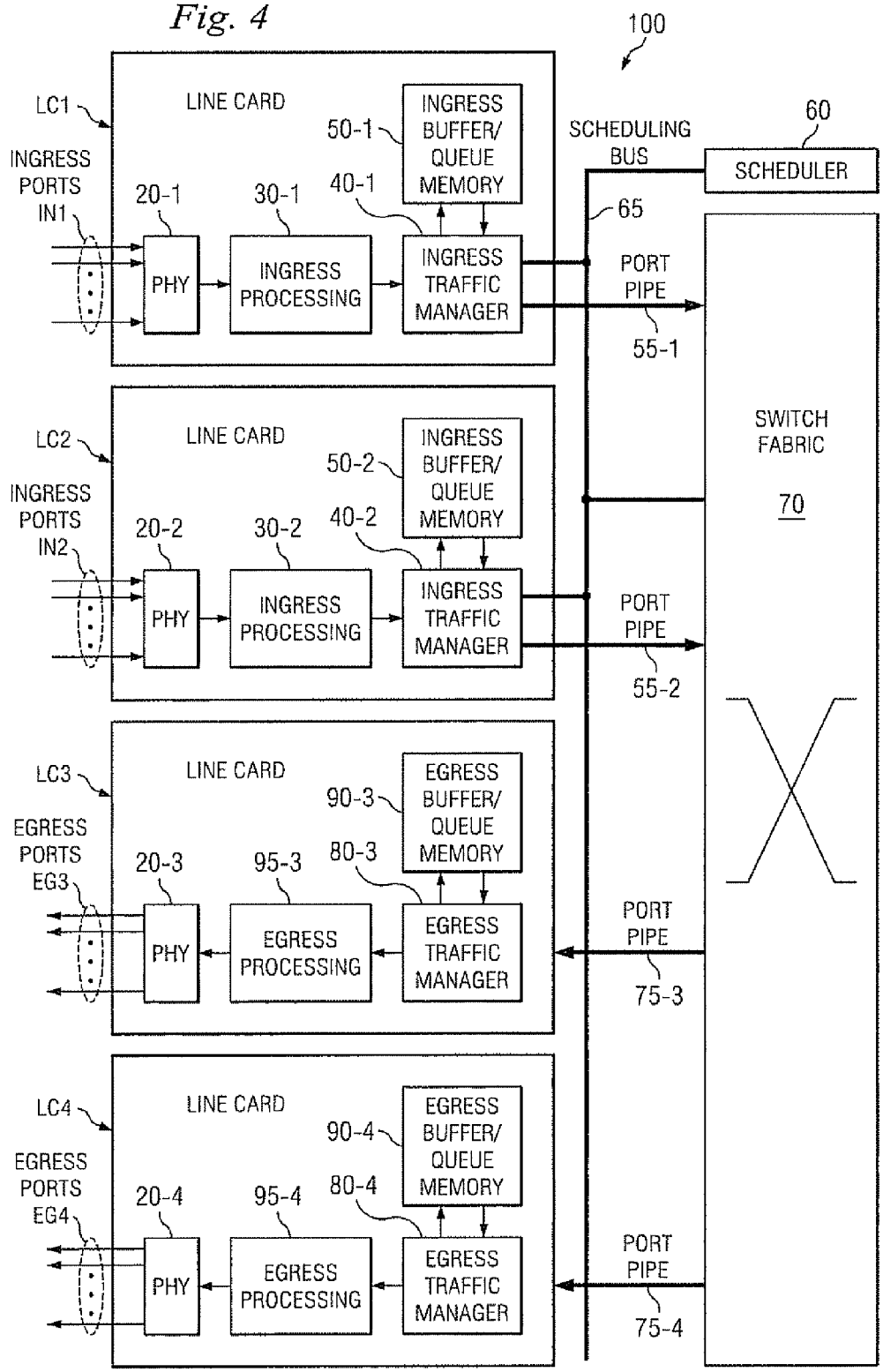
FIG. 4 shows a block diagram of a switch configuration useful with packet-segmenting embodiments.

FIG. 4 shows an exemplary network processing device 100 comprising four line cards LC1 to LC4, a scheduler 60, a switch fabric 70, and several buses implemented on a backplane that connects the line cards, scheduler, and switch fabric. Although each line card is shown as either processing ingress traffic or egress traffic for simplicity, it is understood that most line cards process both ingress and egress traffic. Also, the number of line cards is merely exemplary, as network processing device can contain more or less line cards.

Line card LC1 contains a PHY 20-1, ingress processing 30-1, an ingress traffic manager 40-1, and an ingress buffer/queue memory 50-1. PHY 20-1 receives optical and/or electrical packet data streams on one or more ingress ports In1, and converts these to an electrical format amenable to ingress processing 30-1. Ingress processing classifies the incoming packets, potentially modifies the headers of the packets, and inserts a backplane header on each packet to describe, among other things, each packet's destination line card. The classified, encapsulated packets are then passed to ingress traffic manager 40-1, which decides whether each packet should be dropped due to packet abnormalities (bad CRC, etc.), traffic considerations, etc. Assuming the packet will not be dropped, it is stored in a queue in ingress buffer/queue memory 50-1. The queue is selected according to the packet's priority and its destination line card.

Ingress traffic manager 40-1 reports its queue status to scheduler 60 across a scheduling bus 65. Scheduler 60 runs a scheduling algorithm to determine which switch fabric ingress port pipes (e.g., 55-1 and 55-2) will connect to which switch fabric egress port pipes (e.g., 75-3 and 75-4) during each epoch. The switch fabric configuration for each epoch is transmitted to each line card and switch fabric 70 some time prior to the beginning of that epoch. Ingress traffic manager 40-1 prepares an epoch's worth of packet data for each epoch from one or more of the priority queues associated with the scheduler's designated port pipe pairing. When the epoch begins, the packet data is transferred through port pipe 55-1 to switch fabric 70, where the packet data is switched to an egress port pipe (e.g., port pipe 75-3 to line card LC3).

Line card LC3 contains a PHY 20-3, egress processing 95-3, an egress traffic manager 80-3, and an egress buffer/queue memory 90-3. Egress traffic manager 80-3 receives the packet data from port pipe 75-3 and stores the packet data in egress buffer/queue memory 90-3 (the packet may be dropped at this point based on egress traffic considerations, backplane errors, etc.) Egress traffic manager 80-3 supplies the received packets to egress processing 95-3 for any final packet classification/modification prior to transmission to PHY 20-3. PHY 20-3 converts the packet data to the appropriate optical or electrical format for the designated egress port Eg3 and transmits the packet data.

Line card LC2 contains a PHY 20-2, ingress processing 30-2, an ingress traffic manager 40-2, and an ingress buffer/queue memory 50-2, each functioning similar to the similar units in LC1 (although the PHY can be configured for different signal formats for each card). Similarly, line card LC4 contains a PHY 20-4, egress processing 95-4, an egress traffic manager 80-4, and an egress buffer/queue memory 90-4 each functioning similar to the similar units in LC3.

Figure 5:
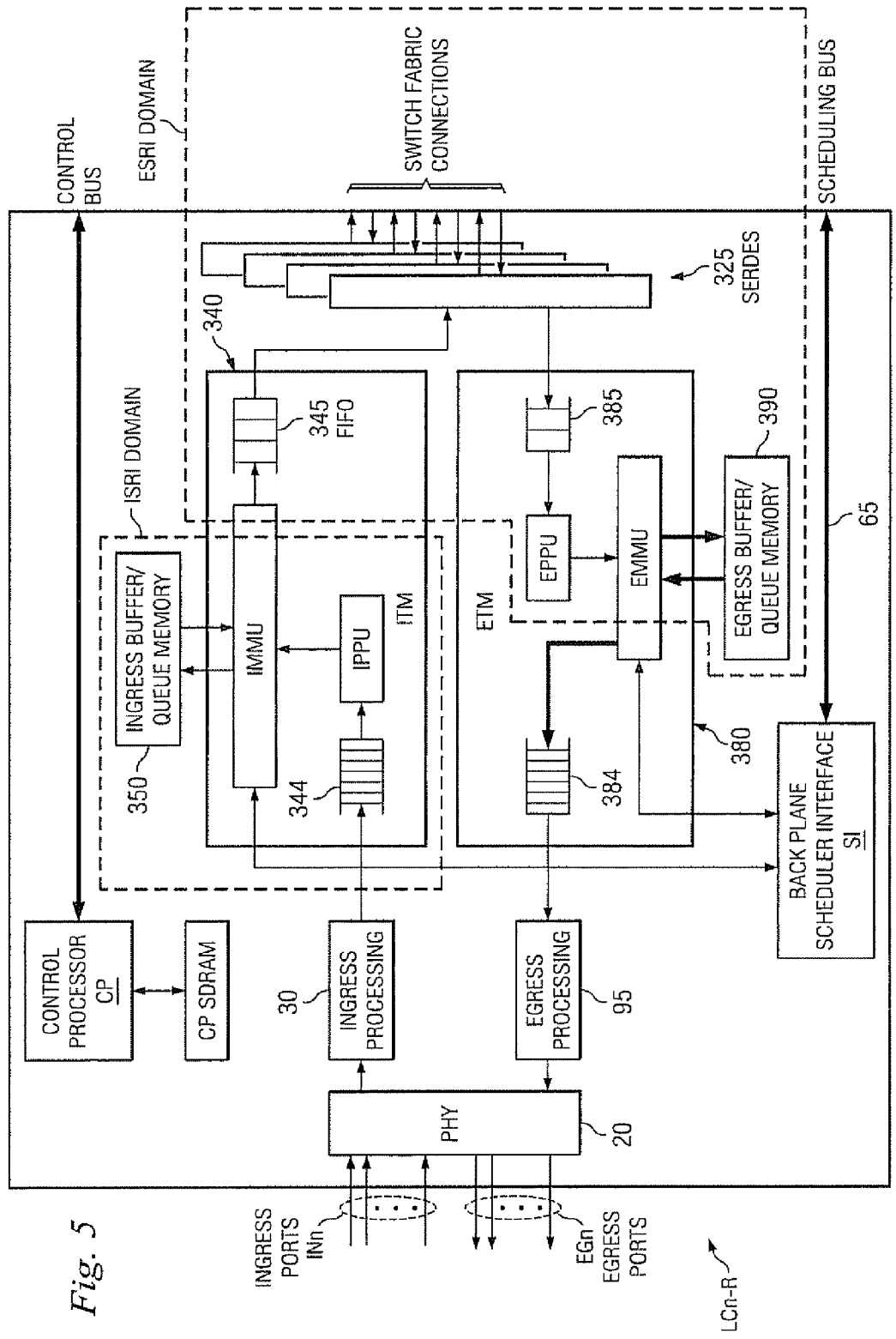
FIG. 5 illustrates details of a line card useful in the switch configuration of FIG. 4.

FIG. 5 contains a more detailed block diagram of a line card LCn-R that combines the functions of the ingress and egress line cards shown in FIG. 4. In addition to the previously described line card blocks, a control processor CP, associated CP SDRAM (synchronous dynamic random access memory), serializer/deserializers (serdes) 325, and a backplane scheduler interface SI are shown. The control processor and associated SDRAM are used to configure the card from a central route processing module (not shown) and convey information to the route processing module across a control bus. The backplane scheduler interface SI serves as an intermediary for scheduling communications with the FIG. 4 scheduler. Likewise, the serdes group 325 communicates across the backplane with the switch fabric as an intermediary between the ITM and ETM and the switch fabric.

Several internal features of ITM 340 and ETM 380 are illustrated. ITM 340 contains an input first-in first-out (IFIFO) 344 to receive packet data from ingress processing 30, an ingress packet processing unit (IPPU) to take packet data from IFIFO 344 and process the data, an output FIFO 345 to send epoch data to serdes group 325, and an ingress memory management unit (IMMU) to coordinate transfer of packet data between the IPPU, OFIFO 345, and ingress buffer/queue memory 350. ETM 380 contains an IFIFO 385 to receive packet data from serdes group 325, an egress PPU to take packet data from IFIFO 385 and process the data, an OFIFO 384 to send packet data to egress processing 95, and an egress MMU to coordinate transfer of packet data between the EPPU, OFIFO 384, and egress buffer/queue memory 390. The operation of these traffic manager components will now be described in further detail.

Figures 6, 7:
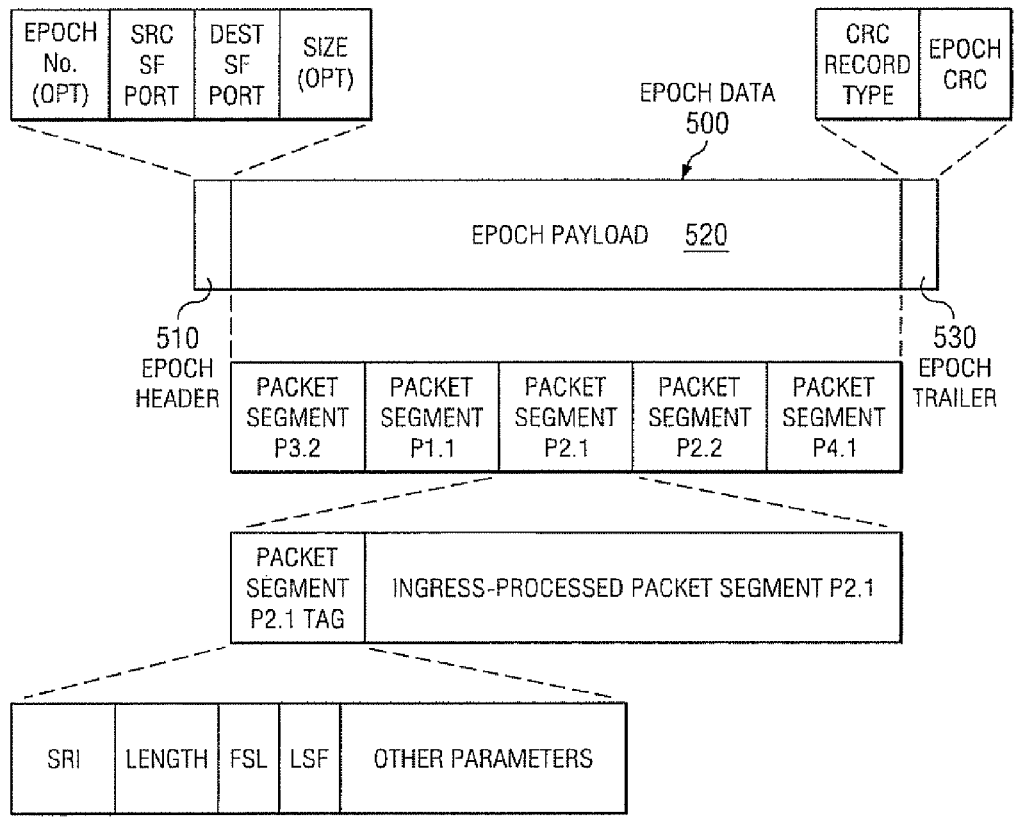
FIG. 6 shows a data format for data transmitted over an epoch.
FIG. 7 depicts how packets of various sizes are internally segmented according to one embodiment.

FIG. 6 contains information on the format of data carried in an epoch from an ingress port pipe to an egress port pipe. Each epoch payload 520 contains an epoch header 510, epoch data 500, and an epoch trailer 530. The epoch header describes the source switch fabric source port ID, switch fabric destination port ID, and optionally the epoch data size and an epoch number. In one embodiment, the IMMU writes the epoch header to OFIFO 345 as each new epoch payload is created. The epoch trailer can comprise, for example, a CRC record type and epoch CRC created by FIFO 345 or the IMMU—the switch fabric and receiving egress line card can use this trailer to detect backplane errors in the epoch payload.

Epoch data 500 contains the packet segments, aligned on four-byte boundaries, that were selected by the IMMU for transmission during the epoch. In this embodiment, these segments are constrained in that all segments for a particular packet will be transmitted in front-to-back order, and one packet will be completed. If a packet has one or more but not all of its segments transmitted during an epoch, the next epoch transmitted from the same SF SPID to the same SF DPID will begin with the remaining segments of the partially-transmitted packet.

Examining packet segment P2.1 as exemplary, it contains a packet segment tag and an ingress-processed packet segment. The packet segment is a portion of the packet as received from ingress processing 30. The packet segment tag is a copy of the backplane header for the packet, with some fields that are specific to the segment. The parameters used by segmentation functions include a source reassembly index (SRI), length field, first segment flag (FSF), and last segment flag (LSF). The SRI changes depending on where the segment is in the device, as will be described below, but in an epoch payload it is the same as the SPID contained in the epoch header. The length, FSF, and LSF parameters will be illustrated further in conjunction with FIG. 7.

FIG. 7 illustrates length, FSF, and LSF values for four different initial packet lengths represented for packets P1 to P4. The example assumes a segment size (SS) of 480 and a maximum segment size (MSS) of 528. The segment size is the "standard" length of all segments except the last segment of a packet. The MSS is a slightly longer size that is allowed for the last segment under certain conditions, as will be illustrated.

First, packet P1 has a packet size of 256, less than the SS. Only one segment P1.1 is created, with a length field of 272—with 16 bytes added to the packet size of 256 to account for the segment header. The segment can be detected as a one-segment packet because both the FSF and the LSF are set to indicate this is both the first and the last segment for the packet.

Packet P2 has a packet size of 800, more than the SS but less than twice the SS. It is segmented into two segments P2.1 and P2.2. The first segment P2.1 has a length of 480 (464 bytes of packet data and 16 bytes of segment header), but in each first segment that is not a last segment the length stored in the header field is the actual length of the entire packet—in this case a length of 816 to account for the packet size plus 16 bytes for the additional backplane header. FSF is set and LSF is unset to indicate this is a first packet segment. The length field meaning therefore varies with the FSF/LSF setting, avoiding the allocation of a separate segment header field for packet length and saving overhead. The entire length is transmitted in the first segment, which also allows for scheduling decisions for an entire packet to be made from the data included in the first segment. Segment P2.2 transmits its true length, 336 bytes of packet data plus 16 bytes of segment header, with FSF unset and LSF set to indicate this is a last packet segment.

Packet P3 has a packet size of 976 bytes, more than twice the SS but less than SS+MSS. In this case, the flags are set similar to P2, but a total length of 992 is contained in P3.1 and a total length of 528 is contained in P3.2. Note that when the last segment is more than SS but less than MSS, it is allowed to exceed SS slightly. This avoids the creation of extremely small segments that might disturb pipeline operation because two segments appear in rapid order in the packet stream.

Packet P4 has a packet size of 1200, more than SS+MSS but less than three times SS. In this case, P4.1 has a length field of 1216 (1200 bytes plus a backplane header), P4.2 has its actual length (480 bytes), and P4.3 has its actual length (288 bytes). P4.2 has neither FSF or LSF set, indicating that it is a middle packet. Longer packets follow the same format as shown for P4, with additional "middle" segments.

Figure 8:
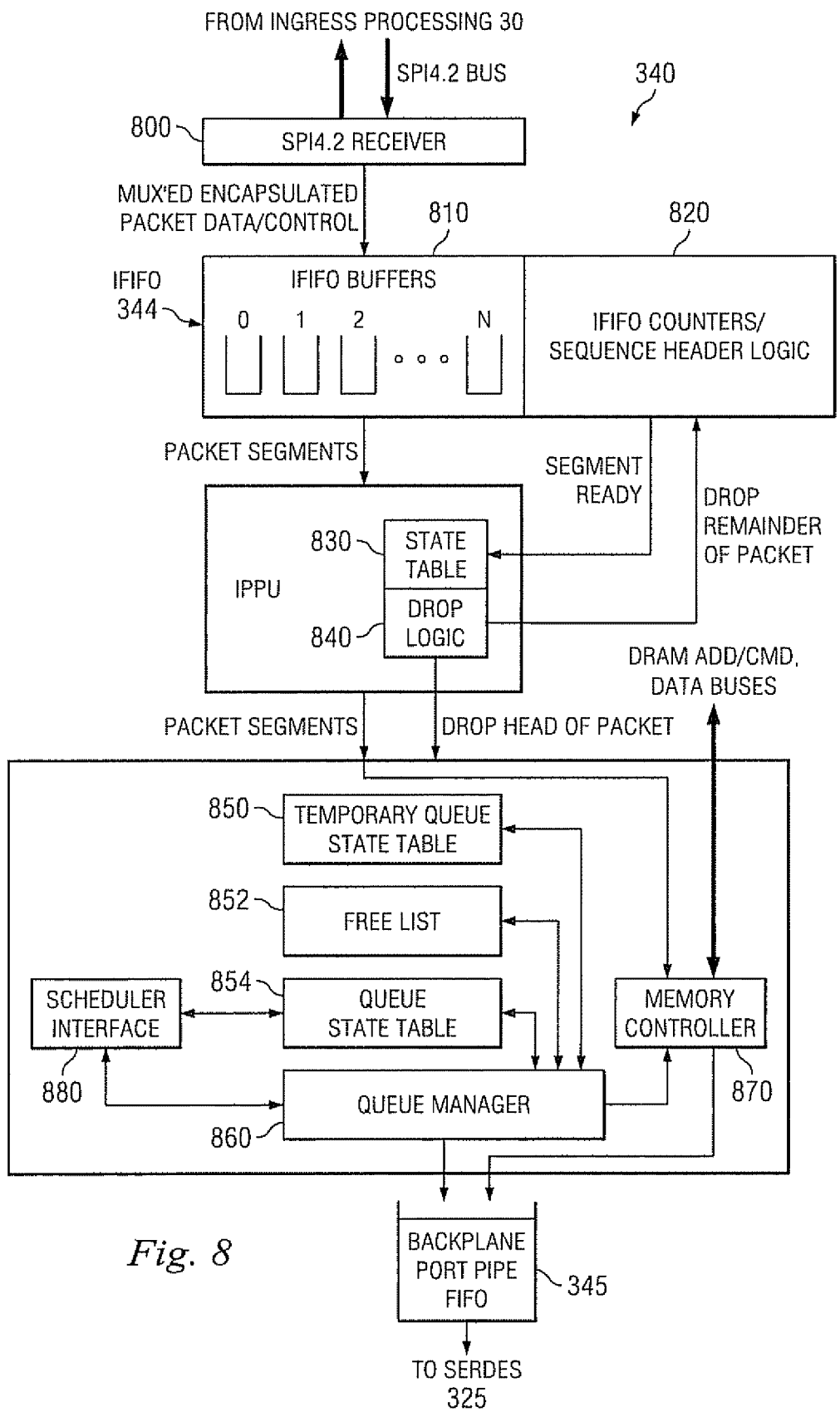
FIG. 8 contains a block diagram for a traffic manager capable of operating according to an embodiment.

FIG. 8 shows additional detail of ITM 340. Ingress processing 30 communicates with an SPI4.2 receiver 800 over an SPI4.2 bus, receiving multiplexed packet bytes for N+1 queues (one for each ingress port plus others for special packets created by the line card). Groups of bytes for different packets are separated by control words that indicate the queue, start of packet (SOP) when a new packet is begun, end of packet (EOP) when a current packet is finished, and other information.

IFIFO 344 comprises a set of IFIFO buffers 810 (numbered 0 to N) and IFIFO counters/sequence header logic 820. The logic accumulates bytes in each buffer until a complete segment is received, either because SS bytes reside in the buffer or because an EOP signal is received for that buffer. Note that in the first case the IFIFO counter is allowed to reach MSS before an SS-byte segment is created, in order to allow last-segment lengths up to MSS. When a segment is created, the backplane header fields are filled in with the actual segment size, FSF, and LSF values, and the IPPU is notified that a segment is ready. If the segment is not the last segment, a copy of the backplane header is inserted in the IFIFO buffer after the current segment to become the backplane header for the next segment. Once all segments are sent for a packet, the counters and state for that IFIFO buffer are reset in preparation for the next packet.

By moving part of the IFIFO function (the gathering of whole packets) into the large external buffer memory 350, the sizes of the on-chip FIFO memory can be reduced significantly.

Without segmentation in the FIFO, the size of the IFIFO is approximately:

$$size1 = number\_of\_ports * max\_packet\_size * F, \text{ where } F \text{ is a number} > 1, \text{ usually from 1 to 2.}$$

With segmentation in the FIFO, the size of the IFIFO is approximately:

$$size2 = number\_of\_ports * max\_segment\_size * F.$$

Therefore, if jumbo packets are to be supported by a system, the savings in the on-chip FIFO memories with the invention can be very significant.

For example, if:
number_of_ports=48,
max_packet_size=9600 bytes,
max_segment_size=528, and
F=2, then:
  size1=48*9600*2=921.6 k bytes
  size2=48*528*2=50.7 k bytes
The ratio of non-segmented IFIFO size to segmented IFIFO size is more than 18 to 1.

By allowing the segments to be sent by the IFIFO before the entire packet is received by the buffering unit, the latency of individual packets can be reduced. Cut-through can be safely done on the ingress buffering unit; cut-through on the egress buffering unit has the danger of under-run on the egress port. If an error is detected in a later segment and the earlier segments have already been sent on the backplane, then an error segment must be stored in the ingress buffer and then sent to the egress buffer to cause the packet in the temporary queue to be discarded.

After segmenting a packet, the segments from one source can be intermixed with segments from another source in the buffer/queue memories. However, from any given source, the segments are linked in order.

The units in the processing pipeline generally need to operate on whole packets. Therefore, a source_index is generated and placed into the segment header to identify the source port that generated the packet. Each source must have a unique value for source_index. The source_index is analogous to the process-id in a multi-tasking operating system. Each processing unit in the pipeline maintains the state that is required from segment to segment in a state table that is indexed by the source_index. Therefore, each source port has a separate context, which is switched for each segment received by the unit based on the source_index.

A simple example is the calculation of CRC (Cyclic Redundancy Check) per packet to determine if the packet is error-free. The CRC code is appended at the end of each packet. When the first segment is received, the CRC function is initialized as follows:
  state_table.crc_state[src_index]=crc32(0xffffffff, segment_data);
For the second and later segments, the computation is this:
  state_table.crc_state[src_index]=crc32(state_table.crc_state[src_index], segment_data);

Other examples of the information that is kept in the state table are the computed packet length and the packet drop decision (when the decision to drop can be made at the first segment).

For the ingress path, the source_index used is called the ISRI. This index is used throughout the ISRI domain comprising the IFIFO, IPPU, and IMMU write function. The index is generated and inserted into the segment header by the IFIFO, and is the source port number. For packets that are internally generated, such as mirroring and control packets, other unique index values are used that do not conflict with the values used by the source ports.

For the egress path, the source_index used is called the ESRI. This index is used throughout the ESRI domain comprising the IMMU read function, port pipe FIFOs and switch fabric, and EMMU write function). The index that is generated and inserted into the segment header by the read function of the IMMU is the source switch fabric port number. Note that the ESRI source index can be generated either prior to storing a segment in buffer/queue memory 350, or after the segment is read by the IMMU from the buffer/queue memory.

The source_index that is used in the ESRI domain is the concatenation of the ESRI from the segment header with the class-id (service class) of the packet. The reason for concatenating the class-id is that the backplane scheduler is allowed to stop in the middle of a packet for one class-id and then schedule from another class-id on the next grant.

If the backplane scheduler is able to complete a packet from one class-id before changing to another, then the ESRI alone can be used as the source_index.

After the packet has been segmented, the segments pass through the IPPU, where various error/traffic shaping functions are performed. A state table 830 in the IPPU tracks each packet, since the IPPU drop logic 840 switches contexts as it switches between the IFIFO buffers. Should a decision to drop a packet be made before the entire packet is received through IFIFO 344, the IPPU signals the IFIFO to drop the remainder of the packet instead of segmenting it. It also signals the IMMU to drop any head of the packet segments that have already been stored to external memory. Some of the errors that can be checked are: missing first segment, missing last segment, size error (the sum of the size of the segments does not match the total packet size), and CRC error. Packets can be dropped from the temporary queues due to other reasons, such as QOS congestion (WRED) or packet larger than the MTU. When a packet is dropped from a temporary queue, the memory consumed by the packet is returned to the free buffer pool and the reason for the drop is recorded in status and error counters.

The packet segments leaving the IPPU are written by the IMMU to a set of queues that are organized based on the destination port. This same action occurs both in the ingress and egress buffering units. The segments for a given source_index are accumulated in a set of temporary queues, indexed by the source_index. A temporary queue state table 850 stores a linked list of segment descriptors that describe the entire packet as contained in memory. New memory segments are received from free list 852 and returned to the free list when the packet is sent. When all the segments in a complete packet are received from a given source_index, and there are no errors detected or drop required, then the packet is transferred from the temporary queue to the permanent queues in queue state table 854. This provides the main part of the reassembly function.

Queue manager 860 manages these functions, including changing the source index, and inserting the total packet length in the first segment once all segments are received. It also communicates with a scheduler interface 880 to accomplish scheduling functions, and with a memory controller 870 that performs the actual reads and writes to the external memory.

In addition, a time-out function is supported to re-claim the memory consumed by the temporary queues. When errors occur on the backplane, the last segment of a packet may be lost. The time-out is per source_index, and returns the memory consumed by the packet to the free buffer pool if the interval between receiving segments from a given source_index exceeds the programmed time-out interval. This allows the recovery of buffer memory when a port is disabled, for example.

When either the backplane scheduler (ingress) or the egress scheduler makes a read request, then packets are read from the requested queue. The request indicates the destination port, which may trigger reading multiple queues based on the class-ids that have packets stored in the buffer. Once a segment is read, the memory used to hold the segment is returned to the free buffer pool.

The egress traffic manager functions in similar fashion to the ingress traffic manager.

Although embodiments of the present disclosure have been described in detail, those skilled in the art should understand that they may make various changes, substitutions and alterations herein without departing from the spirit and scope of the present disclosure. Accordingly, all such changes, substitutions and alterations are intended to be included within the scope of the present disclosure as defined in the following claims. In the claims, means-plus-function clauses are intended to cover the structures described herein as performing the recited function and not only structural equivalents, but also equivalent structures. It should be noted that the names given to modules and components of the system in the detailed description and claims are merely used to identified the modules and components for the sake of clarity and brevity and should not be used to limit or define the functionality or capability thereof unless explicitly described herein.

What is claimed is:

1. A network processing device packet buffering subsystem comprising:
  a first-in first out (FIFO) memory comprising a plurality of FIFO buffers, each associated with a source index, to receive multiplexed packet data marked with source indices and sort the multiplexed packet data to the FIFO buffers according to source index;
  a plurality of counters, associated respectively with the plurality of FIFO buffers, to track a size of each packet as it is received into each FIFO buffer from the multiplexed packet data; and
  segmentation logic to output from the FIFO memory a segment of a packet being received into a given one of the FIFO buffers when the packet data accumulated in that given FIFO buffer for the received packet exceeds a selected data length, the selected data length being less than an amount of data than can be transmitted through a switch fabric associated with the buffering subsystem during a single epoch of time;
  wherein the segmentation logic allows the packet data accumulated for a given segment to exceed the selected data length by up to a selected overflow amount when lengthening the given segment will allow the given segment to be a last segment for its corresponding packet;
  wherein the segmentation logic delays outputting the given segment until it determines whether the given segment can be made the last segment by extending the given segment up to the selected overflow amount.

2. The packet buffering subsystem of claim 1, wherein the segmentation logic repeats the segmentation of the received packet each time the packet data accumulated in the given FIFO buffer for the received packet exceeds the selected data length.

3. The packet buffering subsystem of claim 1, further comprising header logic to place a header on each segment output from the FIFO memory.

4. The packet buffering subsystem of claim 3, wherein the header logic sets flags in the header of each segment, the flags designating each segment as a first and/or a last segment or a middle segment.

5. The packet buffering subsystem of claim 4, wherein the header logic sets the flags to mark a single segment as both a first and a last segment when the single segment can hold the entire packet.

6. The packet buffering subsystem of claim 3, wherein the header logic sets a length field in the header of each segment.

7. The packet buffering subsystem of claim 6, wherein a length field is initially set by the header logic to indicate a length of a corresponding segment.

8. The packet buffering subsystem of claim 7, wherein the length field on a first segment of each multi-segment packet is eventually overwritten to indicate a total length of all segments of a corresponding multi-segment packet.

9. The packet buffering subsystem of claim 3, wherein the header logic places the header on a current segment that is not a first segment of a packet by saving the header from a preceding segment into a head of the FIFO buffer containing the current segment as the preceding segment is output from the FIFO memory, and modifying the saved header as necessary for the current segment.

10. The packet buffering subsystem of claim 1, further comprising a packet processing unit to examine packet segments output from the FIFO memory and make drop decisions for each packet based on the examination of the packet segments.

11. The packet buffering subsystem of claim 10, the packet processing unit comprising a state table to save a state for each packet until that packet is fully segmented and examined by the packet processing unit.

12. The packet buffering subsystem of claim 10, wherein the packet processing unit can at least drop the received packet for having an improper length and to enforce a traffic management profile.

13. The packet buffering subsystem of claim 10, wherein the packet processing unit has a capability to drop the received packet prior to receiving the last segment of the received packet, the packet processing unit consequently signaling the FIFO memory to drop the remainder of the received packet without segmenting it and sending it to the packet processing unit.

14. The packet buffering subsystem of claim 10, wherein the packet processing unit has a capability to drop the received packet after forwarding at least a first segment of the received packet through to a downstream memory management unit, the packet processing unit consequently signaling the memory management unit to drop segments of the received packet already forwarded to the memory management unit.

15. The packet buffering subsystem of claim 1, further comprising:
  a buffer memory to store segments output from the FIFO memory; and
  a memory manager to control storing of the segments to and reading of the segments from the buffer memory, the memory manager comprising:
    a destination queue state table to maintain a state for each of a plurality of virtual queues associated with different packet destinations, the virtual queues sharing the buffer memory, the state for each virtual queue comprising a linked list of segments stored in the buffer memory and destined for a corresponding destination, and
    a temporary queue state table to maintain a state for each packet for which not all segments have yet been received from the FIFO memory, the state for each such packet comprising a linked list of the segments stored for that packet.

16. The packet buffering subsystem of claim 15, further comprising a queue manager to transfer, upon receipt of the last segment for a respective packet that has its state maintained in the temporary queue state table, segments stored for the respective packet included in the linked list corresponding to the respective packet.

17. The packet buffering subsystem of claim 15, wherein the memory manager replaces the source index of each segment with a first source index indicative of the position of the packet buffering subsystem in the network processing device.

18. The packet buffering subsystem of claim 17, wherein the source index is replaced prior to writing a respective segment to the buffer memory.

19. The packet buffering subsystem of claim 15, wherein the memory manager replaces a segment length of a first segment of the received packet with a total length of the received packet.

20. The packet buffering subsystem of claim 19, wherein the segment length of the first segment of the received packet is replaced prior to writing the first segment of the received packet to the buffer memory.

21. The packet buffering subsystem of claim 15, wherein the plurality of virtual queues maintained by the memory manager comprise multiple queues for at least one destination, the multiple queues serving different traffic classes.

22. The packet buffering subsystem of claim 1, implemented on an egress section of a line card.

23. The packet buffering subsystem of claim 1, implemented on an ingress section of a line card.

24. A network processing device comprising:
  an epoch-based switch fabric;
  a backplane supporting multiple ingress port pipes and egress port pipes to the switch fabric;
  an epoch scheduler to schedule connection of ingress port pipes to egress port pipes through the switch fabric for each epoch; and
  a plurality of line cards, each connected to the epoch-based switch fabric by at least one ingress port pipe, each line card connected to a given ingress port pipe that is scheduled for a given epoch, and each line card constructing epoch data for the given epoch by concatenating multiple packet segments having a destination reachable through a given egress port pipe paired with the given ingress port pipe for the given epoch;
  wherein:
    packet segments corresponding to a first one of one or more packets include one or more first packet segments and one or more second packet segments;
    packets are segmented each time the first packet exceeds a selected data length;
    the one or more first packet segments are transmitted in a first epoch;
    the one or more second packet segments are transmitted in a second epoch different from the first epoch;

packet data accumulated for a given segment may exceed the selected data length by up to a selected overflow amount when lengthening the given segment will allow the given segment to be a last segment for its corresponding packet; and transmission of the given segment is delayed until it is determined whether the given segment can be made the last segment by extending the given segment up to the selected overflow amount.

25. A method of operating a network processing device comprising:

receiving multiplexed packet data marked with source indices;

sorting the multiplexed packet data to a plurality of FIFO buffers according to source index;

tracking the size of each packet as it is received into each FIFO buffer from the multiplexed packet data using a plurality of counters, associated respectively with the plurality of FIFO buffers;

performing packet segmentation on a packet being received into a given one of the FIFO buffers; and outputting a segment of the received packet when packet data accumulated in that given FIFO buffer for the received packet exceeds a selected data length, the selected data length being less than the amount of data that can be transmitted through a switch fabric associated with the buffering subsystem during a single epoch of time;

allowing the packet data accumulated for a given segment to exceed the selected data length by up to a selected overflow amount when lengthening the given segment will allow the given segment to be a last segment for its corresponding packet;

delaying outputting the given segment until it is determined whether the given segment can be made the last segment by extending the given segment up to the selected overflow amount.

26. The method of claim 25, wherein the segmentation logic repeats the segmentation of the received packet each time the packet data accumulated in the given FIFO buffer for the received packet exceeds the selected data length.

27. The method of claim 25, further comprising placing a header on each segment output from the FIFO buffers.

28. The method of claim 27, further comprising initially setting a length field in each segment to indicate a length of a respective segment.

29. The method of claim 28, further comprising eventually overwriting a length field on the first segment of each multi-segment packet to indicate a total length of all segments of a corresponding multi-segment packet.

30. The method of claim 27, wherein placing a header on each segment comprises, for each segment that is not a first segment of a packet, saving the header from a preceding segment into a head of the FIFO buffer containing the segment as the preceding segment is output from the FIFO buffer, and modifying the saved header as necessary for the current segment.

31. A network processing device comprising:

an epoch-based switch fabric;

a backplane supporting multiple ingress port pipes and egress port pipes to the switch fabric;

an epoch scheduler to schedule connection of ingress port pipes to egress port pipes through the switch fabric for each epoch;

a plurality of ingress traffic managers, each coupled to the switch fabric by at least one corresponding ingress port pipe, each ingress traffic manager buffering packets, prior to transmission through the switch fabric, as a collection of buffered packet segments, and concatenating multiple buffered packet segments from one or more packets with a common egress port pipe destination to create epoch data for transmission through the switch fabric during each epoch for which the corresponding ingress port pipe is scheduled for connection to a corresponding egress port pipe; and a plurality of egress traffic managers, each connected to the switch fabric by at least one the egress port pipe, each egress traffic manager parsing packet segments received from the ingress traffic managers during epochs in order to buffer the packet segments, and recombining the buffered packet segments for a given packet after all segments of the given packet are received, wherein each of the buffered packets is segmented into one or more packet segments included in the collection of buffered packet segments, and wherein:

the epoch data includes a plurality of the packet segments;

one of the buffered packets includes one or more first packet segments and one or more second packet segments;

the buffered packets are segmented each time the buffered packets exceed a selected data length;

the one or more first packet segments are transmitted in a first epoch;

the one or more second packet segments are transmitted in a second epoch different from the first epoch;

packet data accumulated for a given segment may exceed the selected data length by up to a selected overflow amount when lengthening the given segment will allow the given segment to be a last segment for its corresponding packet; and transmission of the given segment is delayed until it is determined whether the given segment can be made the last segment by extending the given segment up to the selected overflow amount.

32. The network processing device of claim 31, wherein an epoch length is at least ten times a maximum segment length.

33. The network processing device of claim 32, wherein the epoch length is sufficient to allow transmission of a packet of a maximum allowable length without segmentation.

34. The network processing device of claim 32, wherein each ingress traffic manager segments packets according to a source index indicative of a source port, and changes the source index of the given segment to an index assigned to the ingress traffic manager prior to transmitting the given segment as epoch data.

35. The network processing device of claim 32, wherein each ingress traffic manager and egress traffic manager saves state information such that the first packet segments can be transmitted from a given ingress traffic manager to a given egress traffic manager during the first epoch, with the second packet segments being transmitted during the second epoch that corresponds to the same given ingress traffic manager/egress traffic manager pairing as the first epoch.

36. The network processing device of claim 35, wherein the given egress traffic manager stores packet segments as the packet segments are received, the given egress traffic manager comprising a temporary queue state table to save state information for packets that have not had all packet segments received, the state information for each such packet comprising a linked list of the packet segments stored for that packet.

37. The network processing device of claim 36, wherein each egress traffic manager further comprises:

a destination queue state table to maintain a state for each of a plurality of virtual queues associated with different packet destinations, the state for each virtual queue comprising a linked list of packet segments stored and destined for a corresponding destination; and a queue manager to transfer, upon receipt of the last segment for a respective packet that has its state maintained in the temporary queue state table, packet segments stored for the respective packet included in the linked list corresponding to the respective packet.

38. The network processing device of claim 36, wherein each ingress traffic manager further comprises a destination queue state table to maintain a state for each of a plurality of virtual queues associated with different packet destinations, the state for each virtual queue comprising a linked list of segments stored and destined for a corresponding destination, and wherein the segments for a first packet are stored in consecutive order in the linked list of segments stored for a given destination.

39. The network processing device of claim 38, wherein the destination queue state table maintains multiple virtual queues associated with a common packet destination, each virtual queue being associated with at least one packet class, and wherein each egress traffic manager uses a source index associated with a corresponding ingress traffic manager and a traffic class to maintain a state for each packet until all segments for that packet are received.

40. The network processing device of claim 32, wherein each ingress traffic manager comprises segmentation logic to segment packets to create the buffered packet segments, wherein the segmentation logic creates multiple packet segments once the given packet exceeds the selected data length.

41. The network processing device of claim 31, wherein each ingress traffic manager, when concatenating multiple buffered packet segments to create epoch data for a given epoch, concatenates packet segments until a next segment awaiting transmission to the common egress port pipe destination is longer than a space remaining for data transmission during the given epoch.

42. A method of operating a network processing device, the method comprising:
switching packet data during a series of epochs through a switch fabric having multiple ingress port pipes and egress port pipes, each epoch corresponding to a switch fabric configuration that connects given ingress port pipes with given egress port pipes;

for packets received by the network processing device, segmenting each packet exceeding a selected data length prior to switching packet data corresponding to that packet through the switch fabric;

concatenating multiple packet segments from one or more packets with a common egress port pipe destination to create epoch data for transmission through the switch fabric during each epoch from each ingress port pipe scheduled for connection to a corresponding egress port pipe, wherein:
packet segments corresponding to one of the one or more packets include one or more first packet segments and one or more second packet segments;
the one or more first packet segments are transmitted in a first epoch;
the one or more second packet segments are transmitted in a second epoch different from the first epoch;
packet data accumulated for a given segment may exceed a selected data length by up to a selected overflow amount when lengthening the given segment will allow the given segment to be a last segment for its corresponding packet; and
transmission of the given segment is delayed until it is determined whether the given segment can be made the last segment by extending the given segment up to the selected overflow amount;

parsing packet segments received from egress port pipes during epochs in order to buffer the packet segments; and recombining the buffered packet segments for the given packet after all segments of the given packet are received from a respective egress port pipe.

43. The method of claim 42, wherein an epoch length is at least ten times a maximum segment length.

44. The method of claim 43, wherein the epoch length is sufficient to allow transmission of a packet of a maximum allowable length without segmentation.

45. The method of claim 43, wherein segmenting each packet exceeding the selected data length comprises marking packet segments according to a source index indicative of a source port, the method further comprising changing the source index of a first packet segment to an index associated with an ingress port pipe over which epoch data containing the first packet segment will be transmitted, prior to transmitting the first packet segment as epoch data.

46. The method of claim 43, further comprising saving state information in the device prior to each ingress port pipe and after each egress port pipe, such that the first packet segments can be transmitted from a first ingress port pipe to a first egress port pipe during the first epoch, with the second packet segments being transmitted during the second epoch that corresponds to the same ingress port pipe/egress port pipe pairing as the first epoch.

47. The method of claim 46, further comprising storing packet segments at a receiving end of each egress port pipe as the packet segments are received, and concurrently saving state information for packets that have not had all packet segments received, the state information for each such packet comprising a linked list of the packet segments stored for that packet.

48. The method of claim 47, further comprising:
maintaining a state at the receiving end of each egress port pipe for each of a plurality of virtual queues associated with different packet destinations, the state for each virtual queue comprising a linked list of packet segments stored and destined for a corresponding destination; and
transferring, upon receipt of the last segment for a respective packet that has its state information saved at the receiving end of a given egress port pipe, packet segments stored for the respective packet included in the linked list corresponding to the respective packet at the given egress port pipe.

49. The method of claim 47, further comprising maintaining a state at a sending end of each ingress port pipe for each of a plurality of virtual queues associated with different packet destinations, the state for each virtual queue comprising a linked list of packet segments stored and destined for a corresponding destination, and wherein the packet segments for a corresponding packet are stored in consecutive order in the linked list of packet segments stored for the corresponding destination.

50. The method of claim 49, wherein maintaining the state at the sending end of each ingress port pipe comprises maintaining multiple virtual queues associated with a common packet destination, each virtual queue being associated with at least one packet class, and wherein maintaining the state at the sending end of each egress port pipe comprises associating a packet segment state with a source index associated with an ingress port pipe and a traffic class to maintain the state for each packet until all segments for that packet are received.

51. The method of claim 42, wherein concatenating multiple buffered packet segments to create epoch data for a given epoch comprises concatenating segments until a next packet segment awaiting transmission to the common egress port pipe destination is longer than a space remaining for data transmission during the given epoch.

* * * * *